United States Patent
Yang et al.

(10) Patent No.: US 9,273,248 B2
(45) Date of Patent: Mar. 1, 2016

(54) BLUE PHASE LIQUID CRYSTAL COMPOSITE MATERIAL AND LIQUID CRYSTAL DISPLAY CONTAINING THE SAME

(71) Applicant: BOE TECHNOLOGY GROUP CO., LTD., Beijing (CN)

(72) Inventors: Huai Yang, Beijing (CN); Ling Wang, Beijing (CN); Wanli He, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 81 days.

(21) Appl. No.: 14/236,226

(22) PCT Filed: Dec. 31, 2013

(86) PCT No.: PCT/CN2013/091127
§ 371 (c)(1),
(2) Date: Jan. 30, 2014

(87) PCT Pub. No.: WO2014/154011
PCT Pub. Date: Oct. 2, 2014

(65) Prior Publication Data
US 2014/0291579 A1   Oct. 2, 2014

(30) Foreign Application Priority Data
Mar. 28, 2013   (CN) .......................... 2013 1 0105080

(51) Int. Cl.
*C09K 19/52*   (2006.01)
*C09K 19/54*   (2006.01)
*C09K 19/02*   (2006.01)

(52) U.S. Cl.
CPC ........... *C09K 19/542* (2013.01); *C09K 19/0275* (2013.01); *C09K 2019/521* (2013.01); *C09K 2019/546* (2013.01)

(58) Field of Classification Search
CPC .... C09K 19/0275; C09K 19/52; C09K 19/54; C09K 19/542; C09K 2019/521; C09K 2019/546
See application file for complete search history.

(56) References Cited

U.S. PATENT DOCUMENTS

| | | | |
|---|---|---|---|
| 2012/0249928 A1 * | 10/2012 | Kaihoko et al. | ................. 349/69 |
| 2012/0262662 A1 | 10/2012 | Chien et al. | |
| 2014/0111759 A1 | 4/2014 | Yang et al. | |

FOREIGN PATENT DOCUMENTS

| | | |
|---|---|---|
| CN | 102585841 A | 7/2012 |
| CN | 102786935 A | 11/2012 |
| CN | 102952551 A | 3/2013 |
| CN | 103215050 A | 7/2013 |

OTHER PUBLICATIONS

Second Chinese Office Action dated Jul. 30, 2014; Appln. No. 201310105080.2.
Chinese Rejection Decision dated Jan. 5, 2015; Appln. No. 201310105080.2.
International Search Report issued Feb. 26, 2014; PCT/CN2013/091127.
First Chinese Office Action dated Mar. 11, 2014; Appln. No. 201310105080.2.
International Preliminary Report on Patentability issued Sep. 29, 2015; PCT/CN2013/091127.

* cited by examiner

*Primary Examiner* — Shean C Wu
(74) *Attorney, Agent, or Firm* — Ladas & Parry LLP

(57) ABSTRACT

This disclosure relates to a blue phase liquid crystal composite material formed by photopolymerization of material components comprising a parent blue phase liquid crystal, a photo-polymerizable monomer, a photoinitiator, and inorganic nanoparticles; and to a liquid crystal display comprising the blue phase liquid crystal composite material. The blue phase liquid crystal composite material has a low driving voltage, no electro-optical hysteresis, and rapid response time to an electric field.

10 Claims, 3 Drawing Sheets

BLUE PHASE LIQUID CRYSTAL COMPOSITE MATERIAL AND LIQUID CRYSTAL DISPLAY CONTAINING THE SAME

FIELD OF INVENTION

The embodiments of the invention relate to a blue phase liquid crystal composite material and a liquid crystal display containing the same.

BACKGROUND OF INVENTION

Liquid crystalline Blue Phase (BP) is a special phase which is macroscopically between the isotropic phase and the cholesteric phase, and often occurs in high chiral liquid crystal systems. Microscopically, the blue phase is a lattice defect phase without exhibiting birefringence, and the magnitude of lattice parameters of BP is comparable the wavelength of visible light (i.e., hundreds of nanometers). The blue phase can be divided into three subphases according to their crystal structures, which are designated as blue phase I (BPI), blue phase II (BPII), and blue phase III (BPIII), respectively. The corresponding crystal lattice structures thereof are body-centered cubic structure, simple cubic structure, and amorphous state, respectively. The blue phase crystal material is considered as the most promising next-generation liquid crystal display material due to its microsecond level response time to an electric field. In comparison with a conventional liquid crystal display, a blue phase liquid crystal display has the following four prominent advantages.

(1) Due to the microsecond level response time to an electric field, the blue phase liquid crystal can be field-sequentially driven and thus a color filter is no longer required, which not only reduces the material cost, but also improves the efficiency of the backlight source.

(2) Due to the microscopically optical isotropy, the internal surface of the substrate of the blue phase liquid crystal display does not need orientation treatment, which can simplify greatly the manufacturing process thereby reducing manufacture costs.

(3) The blue phase liquid crystal display has a wide visual property. Thus, a visual compensation film is no longer required, and the width of the visual field can be controlled according to the practical requirements.

(4) The light transmissivity of the blue phase liquid crystal display is not affected by the substrate gaps, and thus the substrate gap does not need to be strictly controlled. Thus, the manufacture process can be substantially simplified so as to reduce the manufacture costs.

However, since the monomer content in a polymeric blue phase liquid crystal is usually less than 10 wt %, the polymeric network is very prone to deformation under damages caused by the electric field, which eventually reduces greatly the life of the liquid crystal display.

In order to improve the performances of the blue phase liquid crystal, it is possible to disperse uniformly the droplets of a blue phase liquid crystal in the polymer matrix to form a polymer dispersed blue phase liquid crystal. A polymer network exhibits a better stability in an electric field, and is convenient for a large-scale production.

However, because the polymer network has strong constraining effect on liquid crystal molecules, the blue phase liquid crystal has high driving voltage. Moreover, in a strong electric field, blue phase liquid crystal droplets are very prone to phase transition which leads to electro-optical hysteresis. Therefore, development of a blue phase liquid crystal composite material having low driving voltage and no electro-optical hysteresis property has important theoretical significance and practical value.

SUMMARY OF INVENTION

The embodiments of the present invention are directed to a blue phase liquid crystal composite material having low driving voltage and almost no electro-optical hysteresis, and to a liquid crystal display containing the blue phase liquid crystal composite material.

An embodiment of the invention provides a blue phase liquid crystal composite material formed by photopolymerization of material components comprising: a parent blue phase liquid crystal, a photo-polymerizable monomer, a photoinitiator, and inorganic nanoparticles.

For instance, the material components comprises, based on the total weight of the material components:
68.0 wt %~88.95 wt % of a parent blue phase liquid crystal;
10.0 wt %~30.0 wt % of a photo-polymerizable monomer;
1.0 wt %~3.0 wt % of a photoinitiator; and
0.05 wt %~2.0 wt % of inorganic nanoparticles.

In another aspect, the parent blue phase liquid crystal has a blue phase temperature range of 5.0° C. or above.

In a further aspect, the components of the parent blue phase liquid crystal include SLC-X, R811 and Iso-(6OBA)$_2$, wherein the structure formulae for R811 and Iso-(6OBA)$_2$ are:

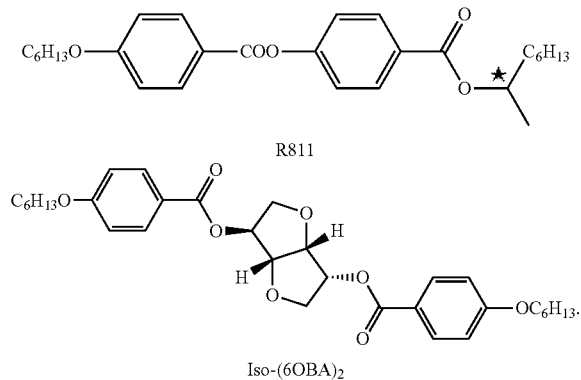

For instance, the parent blue phase liquid crystal comprises, based on the total weight of the parent blue phase liquid crystal: 70.0 wt %~85.0 wt % of SLC-X; 5.0 wt %~15.0 wt % of R811; and 5.0 wt %~15.0 wt % of Iso-(6OBA)$_2$.

In yet another aspect, the parent blue phase liquid crystal has a the blue phase temperature range of 5.0° C.~20.0° C.

In yet another aspect, the photoinitiator is represented by the formula of:

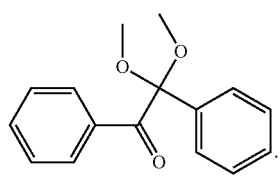 [SMILES: COC(OC)(C(=O)c1ccccc1)c1ccccc1]

In yet another aspect, the photo-polymerizable monomer is a non-liquid crystal acrylate monomer.

For instance, the non-liquid crystal acrylate monomer is a mixture of mono-functional monomers and multi-functional monomers, wherein the molar ratio of the mono-functional monomers to the multi-functional monomers in the non-liquid crystal acrylate monomer is 1:1~1:9.

For instance, the mono-functional monomer is TMHA, and the multi-functional monomer is BDDA, the molar ratio of which is TMHA:BDDA=1:4, wherein TMHA is represented by the following formula:

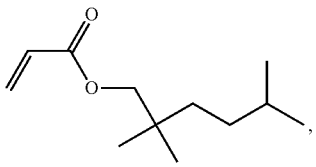

and BDDA is represented by the following formula:

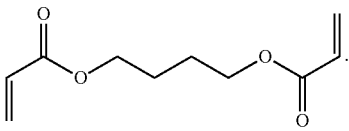

In yet another aspect, the inorganic nanoparticles have a particle size ranging from 3 nm to 300 nm.

In yet another aspect, the inorganic nanoparticles may undergo surface modification.

In yet another aspect, the inorganic nanoparticles may be one or more selected from the group consisting of non-ferroelectric nanoparticles ZnS, ZnO, GdS and GdSe.

In yet another aspect, the inorganic nanoparticles may be one or more selected from the group consisting of ferroelectric nanoparticles $BaTiO_3$, $Sn_2P_2S_6$, $LiNbO_3$ and $PbTiO_3$.

DETAILED DESCRIPTION OF INVENTION

Figure 1:
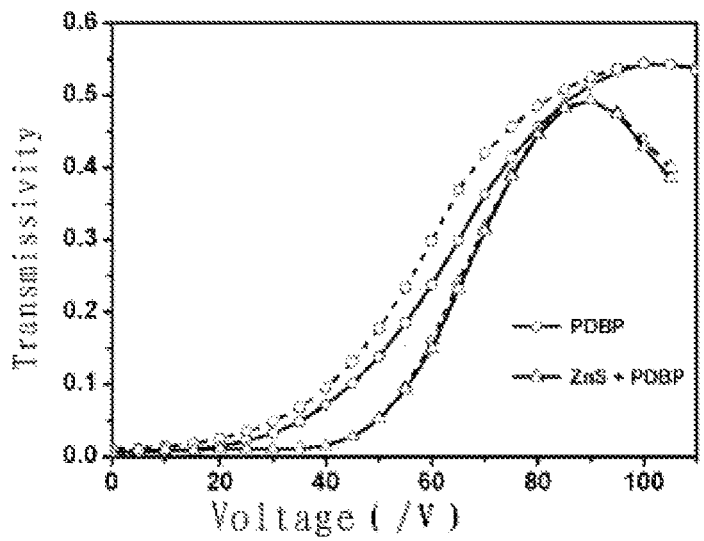
FIG. 1 is a graph exhibiting voltage vs. transmissivity of the blue phase liquid crystal composite material prepared in accordance with Example 1 of the invention.

In order to illustrate the technical solutions of the invention more clearly, the present invention is further described in detail with reference to the figures and embodiments.

The driving voltage of a polymer dispersed blue phase liquid crystal material depends primarily on the Kerr constant of the material and the device parameter A of the display device. Increasing K value or decreasing A value facilitates reducing the driving voltage of the blue phase liquid crystal; and increasing the birefringence and dielectric constant of the material facilitates increasing the K value. Moreover, the A value depends primarily on the configuration of the electrode of the device. An electrode structure capable of generating a uniform electric field in the liquid crystal layer facilitates reducing the A value.

The inorganic nanoparticles have relatively large refractive indices and dielectric constants. Introducing the nanoparticles into the liquid crystal facilitate increasing the birefringence and the dielectric constant of the liquid crystal, thereby increasing the Kerr constant of the blue phase liquid crystal, and decreasing the driving voltage of the blue phase liquid crystal composite material to some extent.

Meanwhile, the relatively large dipole moment of the inorganic nanoparticles can reduce the electro-optical hysteresis of the blue phase liquid crystal composite material.

Further, inorganic ferroelectric nanoparticles can generate polarized field in an electric field, and thus a uniformly distributed electric field will be formed within the liquid crystal layer by utilizing the polarized field formed spontaneously by the ferroelectric nanoparticles after introduction of the inorganic ferroelectric nanoparticles into the blue phase liquid crystal, so as to decrease eventually the device parameter A of the display device and reduce the driving voltage of the blue phase liquid crystal.

In the embodiments of the present invention, the driving voltage of the blue phase liquid crystal display material is greatly reduced, and the reversible recovery of the blue phase liquid crystal in an electric field is achieved by introducing inorganic nanoparticles into the blue phase liquid crystal. The system of preparing the blue phase liquid crystal composite material according to the embodiments of the present invention has advantages of stability, simple process, low viscosity, low driving voltage, no electro-optical hysteresis, and rapid response to an electric field.

An embodiment of the present invention provides a blue phase liquid crystal composite material formed by photopolymerization of material components comprising a parent blue phase liquid crystal, a photo-polymerizable monomer, a photoinitiator, and inorganic nanoparticles.

Among others, the material components may comprise, based on the total weight of material components:

68.0 wt %~88.95 wt % of the parent blue phase liquid crystal;

10.0 wt %~30.0 wt % of the photo-polymerizable monomer;

1.0 wt %~3.0 wt % of the photoinitiator; and 0.05 wt %~2.0 wt % of the inorganic nanoparticles.

Among others, the parent blue phase liquid crystal may comprise, e.g., 68.0%, 68.5%, 75%, 80%, 85% or 88.95% based on the total weight of the material components; the photo-polymerizable monomer may comprise, e.g., 10%, 15%, 20%, 22.95%, 27% or 30% based on the total weight of the material components; the photoinitiator may comprise, e.g., 1.0%, 2.0% or 3.0% based on the total weight of the material components; and the inorganic nanoparticles may comprise, e.g., 0.05%, 0.5%, 1.0%, 1.5% or 2.0% based on the total weight of the material components.

The aforesaid parent blue phase liquid crystal can have a blue phase temperature range of 5.0° C. or above.

The aforesaid parent blue phase liquid crystal may comprise SLC-X, R811 and Iso-(6OBA)$_2$, wherein R811 and Iso-(6OBA)$_2$ are represented by the formulae of:

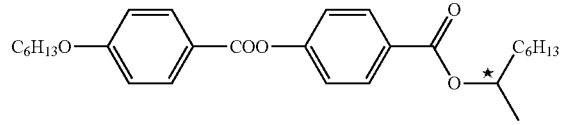

R811

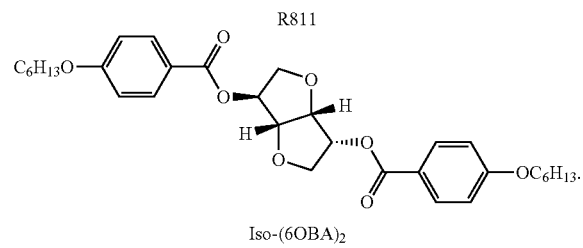

Iso-(6OBA)$_2$

The parent blue phase liquid crystal may comprise, based on the total weight of the parent blue phase liquid crystal, 70.0 wt %~85.0 wt % of SLC-X; 5.0 wt %~15.0 wt % of R811; and 5.0 wt %~15.0 wt % of Iso-(6OBA)$_2$.

Among others, SLC-X may comprise, e.g., 70%, 75%, 80%, 82% or 85% based on the total weight of the parent blue phase liquid crystal; R811 may comprise, e.g., 5%, 8%, 10% or 15% based on the total weight of the parent blue phase liquid crystal; and Iso-(6OBA)$_2$ may comprise, e.g., 5%, 8%, 10%, 12% or 15% based on the total weight of the parent blue phase liquid crystal.

The aforesaid parent blue phase liquid crystal may have a blue phase temperature range of 5.0° C.~20.0° C.

In one aspect, other ingredients and concentrations of the prior art may be used in the parent blue phase liquid crystal, as long as it has a blue phase temperature range of 5° C. or above.

For instance, the blue phase liquid crystal material has a viscosity of less than 50 mPa, a melting point in the range of −20° C.~25° C., and a clearing point in the range of 30° C.~200° C.

The photoinitiator may be represented by the formula of:

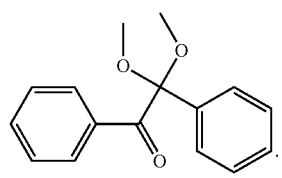 [SMILES: COC(OC)(C(=O)c1ccccc1)c1ccccc1]

The photo-polymerizable monomer may be a non-liquid crystal acrylate monomer.

The non-liquid crystal acrylate monomer may be a mixture of mono-functional monomers and multi-functional monomers, wherein the molar ratio of the mono-functional monomers to the multi-functional monomers may be 1:1~1:9 in the non-liquid crystal acrylate monomer.

The mono-functional monomer may be TMHA; the multi-functional monomer may be BDDA; and the molar ratio of the mono-functional monomers to the multi-functional monomers may be TMHA:BDDA=1:4, wherein TMHA is represented by the following formula:

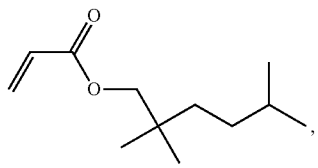

and
BDDA is represented by the following formula:

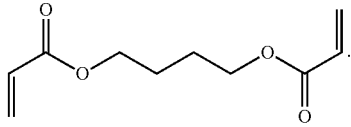

The inorganic nanoparticles may have a particle size of 3 nm~300 nm.

Among others, the inorganic nanoparticles may have a particle size of, e.g., 3 nm, 30 nm, 100 nm, or 300 nm.

The inorganic nanoparticles may be one or more selected from the group consisting of non-ferroelectric nanoparticles ZnS, ZnO, GdS and GdSe.

The inorganic nanoparticles may be one or more selected from the group consisting of ferroelectric nanoparticles BaTiO$_3$, Sn$_2$P$_2$S$_6$, LiNbO$_3$ and PbTiO$_3$.

The inorganic nanoparticles may undergo surface modification. For instance, non-ferroelectric nanoparticles, such as, ZnS, ZnO, GdS and GdSe, may undergo surface modification, such as, via surface modifying process including microemulsion method, surfactant method, and the like prior to use, so as to improve their dispersibility; and ferroelectric nanoparticles, such as, BaTiO$_3$, Sn$_2$P$_2$S$_6$, LiNbO$_3$ and PbTiO$_3$, may undergo surface modification, such as, via introduction of surfactants during use so as to improve their dispersibility.

Another embodiment of the present invention provides a liquid crystal display comprising the blue phase liquid crystal composite material in accordance with the embodiment of the invention. In one aspect, the liquid crystal display may be any product or component having display function, such as, liquid crystal panel, cell phone, tablet computer, TV, display, laptop computer, digital frame, navigator, or the like.

The following examples are used to illustrate, rather than limit the scope of the invention.

EXAMPLE 1

The example prepares a blue liquid crystal composite via photopolymerization from 100 g of material components. The material components comprised: 68.5 g of parent blue phase liquid crystal, 30.0 g of photo-polymerizable monomer, 1.0 g of photoinitiator, and 0.5 g of inorganic nanoparticles ZnS.

The blue phase liquid crystal composite material was prepared by the following steps:

Step 1: Preparation of Inorganic Nanoparticles ZnS

A surfactant Triton X-100 (50 ml) was added into cyclohexane (200 ml). An aqueous solution of thioacetamide (0.3 mol/L, 60 ml) was added into the so-prepared solution of surfactant Triton X-100 in cyclohexane. With magnetic agitation, n-butanol (120 ml) was slowly added dropwise until the solution was clear, thereby yielding a thioacetamide microemulsion.

A zinc acetate microemulsion was prepared using the same manner as above, except that the aqueous solution of thioacetamide was replaced with an aqueous solution of zinc acetate (0.3 mol/L, eq).

The prepared thioacetamide microemulsion was mixed with the prepared zinc acetate microemulsion. The resultant mixture was thoroughly agitated with a magnetic agitator, and reacted under ultrasound wave for 6 hours to give a pale yellow emulsion. The emulsion was rotary evaporated, broken by adding ethanol, and subject to isolation by centrifugation. The isolated solids were washed with water (2×) and ethanol (2×), dried under vacuum, and yield 1.0 g of spherical non-ferroelectric inorganic nanoparticles ZnS having an average particle size of about 3 nm.

0.5 g of ZnS nanoparticles were weighed and added into an acetone solvent (1.5 g) for ultrasound treatment so as to allow them thoroughly dispersed in the solvent, to give a dispersion of ZnS nanoparticles in acetone.

Step 2, Preparation of the Parent Blue Phase Liquid Crystal 82.0 g of mixed crystals SLC-X (Yongsheng Huatsing Liquid Crystal Co., Ltd, Δn=0.235, Δ∈=29.6, at 298K), 13.0 g of R811 and 5.0 g of Iso-(6OBA)$_2$ were mixed to prepare the parent blue phase liquid crystal. This parent blue phase liquid crystal had a blue phase temperature range of about 10.0° C. Among others, the chiral compounds R811 and Iso-(6OBA)$_2$ were represented by the formulae of:

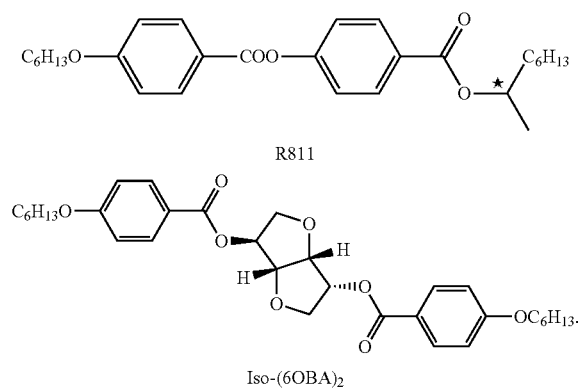

68.5 g of of the prepared parent blue phase liquid crystal was weighed for use in the next step.

Step 3, Preparation of the Blue Phase Liquid Crystal Prepolymer

A mixture of mono-functional monomer TMHA and bi-functional monomer BDDA was used as the photo-polymerizable monomers, wherein the molar ratio of TMHA to BDDA was 1:4, wherein the mono-functional monomer TMHA was represented by the formula of:

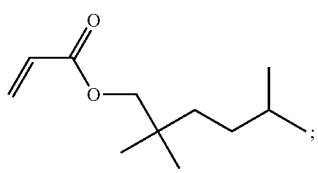

the bi-functional monomer BDDA was represented by the formula of:

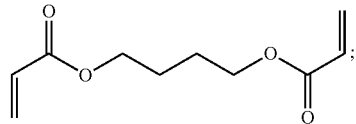

and
the photoinitiator was represented by the formula of:

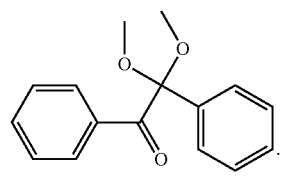 [SMILES: COC(OC)(C(=O)c1ccccc1)c1ccccc1]

30.0 g of photo-polymerizable monomers and 1.0 g of photoinitiator were mixed with 68.5 g of parent blue phase liquid crystal prepared in Step 2. The resultant mixture was thoroughly agitated to uniform to give a blue phase liquid crystal prepolymer (PDBP).

Step 4, Preparation of the Nanoparticle-Doped Blue Phase Liquid Crystal Prepolymer The dispersion of ZnS nanoparticles in acetone prepared in Step 1 was dispersed in the blue phase liquid crystal prepolymer prepared in Step 3, and the resultant system was mixed uniformly. The mixture stood under vacuum for 24 hours to allow the solvent to completely evaporate, thereby yielding the desired nanoparticle-doped blue phase liquid crystal prepolymer.

Step 5, Preparation of the Blue Phase Liquid Crystal Composite Material

The nanoparticle-doped blue phase liquid crystal prepolymer prepared in step 4 was agitated uniformly, and then filled into a liquid crystal box by way of syphonage. The sample was maintained in a blue phase state with a precise temperature control heating platform, and subject to UV radiation for 5 minutes to form a polymer net work via the intermolecular crosslinking reaction between the photo-crosslinkable groups, thereby yielding a blue phase liquid crystal composite material (PDBP+ZnS).

Test Method:

The electro-optical performance of the blue phase liquid crystal composite material of the example was accessed by the following process:

1. The Electro-Optical Hysteresis Property of the Blue Phase Liquid Crystal Composite Material The electro-optical hysteresis property of a blue phase liquid crystal is usually defined as $\Delta V/V_{on}$, wherein $V_{on}$ is the corresponding voltage value under the maximum of transmissivity, and $\Delta V$ is the difference between the forward and reverse voltage when the transmissivity is half of the maximal transmissivity. The lower the $\Delta V/V_{on}$ value, the lower is the electro-optical hysteresis; and vice versa.

2. Calculation of the Kerr Constant K and Device Parameter A of the Blue Phase Liquid Crystal Composite Material Calculation of the Kerr constant K: In accordance with the equation for the Kerr effect, $\Delta n_{induced}/\lambda$ is proportional to the square of the electric field strength E within a certain range of field strength. Accordingly, a plot of $\Delta n_{induced}/\lambda$ vs. E is depicted, and the corresponding linear slope was calculated as the Kerr constant K.

$$\Delta n_{induced} = \lambda K E^2 \qquad (1)$$

Calculation of the device parameter A: The driving voltage (i.e., the on voltage $V_{on}$) is closely related to the Kerr constant of the material and the configuration of the device electrode, and the relationship among them can be represented by the following equation:

$$V_{on}=A/\sqrt{K} \qquad (2),$$

wherein A represents the device parameter which is affected by the configuration of the electrode; and K is the Kerr constant of the material. In order to determine the device parameter A, each sample was measured for the driving voltage and Kerr constant under the same testing conditions (the same testing temperature and the same sample liquid crystal box). On the basis, a plot $V_{on}$ vs. $1/\sqrt{K}$ was depicted, and the linear slope is calculated as the device parameter A.

Testing Results:

As shown in FIG. 1, it can be seen from the graph of voltage vs. transmissivity of the blue phase liquid crystal prepolymer (PDBP) and the blue phase liquid crystal composite material (PDBP+ZnS) that the driving voltage of the liquid crystal decreased from 100V to 90V by incorporation of 0.5 wt % ZnS nanoparticles.

Figure 2:
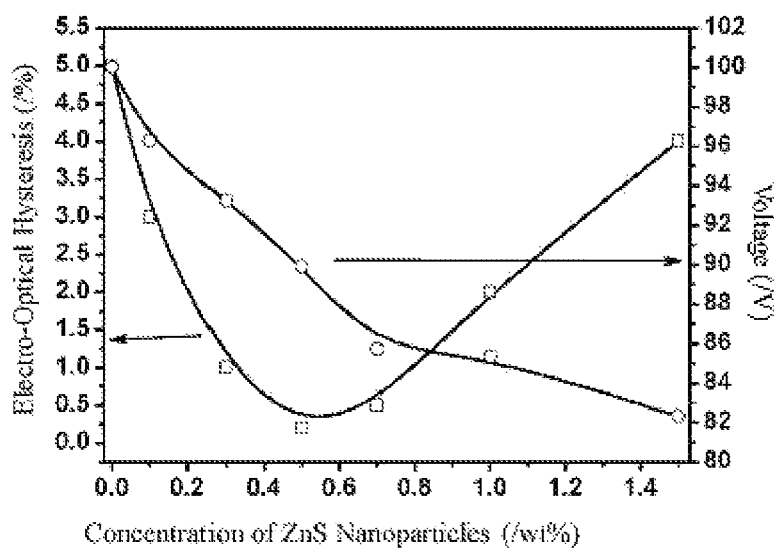
FIG. 2 is a graph exhibiting the relationship between the driving voltage and the electro-optical hysteresis of the blue phase liquid crystal composite material and the ZnS nanoparticle concentrations.

As shown in FIG. 2, the inventor further studied the relationship between the driving voltage and the electro-optical hysteresis of the blue phase liquid crystal composite material and the ZnS nanoparticle concentration. It can be seen from FIG. 2 that the driving voltage of the blue phase liquid crystal composite material decreases gradually with increase of the nanoparticle concentration; while the electro-optical hysteresis shows a tendency of initially decreasing, followed by increasing. Among others, it appears almost no hysteresis as 0.5 wt % ZnS nanoparticle was incorporated.

Figure 3:
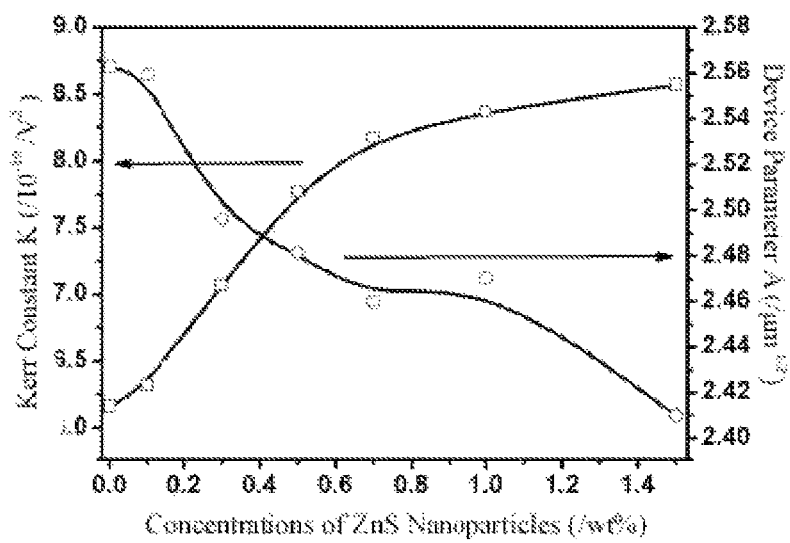
FIG. 3 is a graph exhibiting the relationship between the Kerr constant K and the device parameter A of the blue phase liquid crystal composite material and the ZnS nanoparticle concentrations.

Referring to FIG. 3, the inventor further studied the relationship between the Kerr constant K and the device parameter A of the blue phase liquid crystal composite material and the ZnS nanoparticle concentration. It can be seen from FIG. 3 that the Kerr constant K of the blue phase liquid crystal increases gradually with increase of the nanoparticle concentration; while the device parameter A slightly decreased.

EXAMPLE 2

This example prepared a blue phase liquid crystal composite material via photopolymerization from 100 g of material components. The material components comprised 88.95 g of parent blue phase liquid crystal, 10.0 g of photo-polymerizable monomer, 1.0 g of photoinitiator and 0.05 g of inorganic nanoparticles $BaTiO_3$.

The blue phase liquid crystal composite material was prepared by the following steps:

Step 1, Preparation of the Inorganic Nanoparticles $BaTiO_3$

Large particulate $BaTiO_3$ powders having an average particle diameter of about 1 micron (0.5 g) was mixed with a surfactant oleic acid (1 g) and a vehicle heptane (5 g). After ultrasound dispersion, the mixture was ground for 15 hours on a planetary high energy ball mill. The dispersion obtained by ball milling was transferred into a beaker, stood for 3 days, and then was filtered with a screen to remove particles with large particle size, so as to give a dispersion. 1 ml dispersion was taken and oven-dried to give powders (0.058 g). On the basis, the concentration of the dispersion was calculated to be 0.25 mol/L. A small amount of the resultant powers were dispersed in heptane and underwent ultrasound treatment to prepare a suspension. A suspension droplet was then transferred onto a copper mesh and observed under a 100 kV JEM-100CX☐ transmission electron microscope. The average diameter of the $BaTiO_3$ particles was measured as 30 nm.

Step 2, Preparation of the Parent Blue Phase Liquid Crystal

A parent blue phase liquid crystal was prepared using the same procedures as Step 2 of Example 1, except that the material components for preparing the parent blue phase liquid crystal were 80.0 g of mixed crystal SLC-X (Yongsheng Huatsing Liquid Crystal Co., Ltd, $\Delta n=0.235$, $\Delta\in=29.6$, at 298K), 8.0 g of R811; and 12.0 g of Iso-$(6OBA)_2$. This parent blue phase liquid crystal had a blue phase temperature range of about 5.0° C. 88.95 g of the so-prepared parent blue phase liquid crystal was taken for use in the next step.

Step 3, Preparation of the Blue Phase Liquid Crystal Prepolymer

The blue phase liquid crystal prepolymer was prepared using the same procedures as Step 3 of Example 1, except that the molar ratio of TMEA to BDDA was 1:1; and the amounts of the photo-polymerizable monomer, the photoinitiator and the parent blue phase liquid crystal were 10.0 g, 1.0 g and 88.95 g, respectively.

Step 4, Preparation of the Nanoparticle-Doped Blue Phase Liquid Crystal Prepolymer The dispersion containing 0.5 g of inorganic nanoparticles $BaTiO3$ was dissolved in heptane, together with the blue phase liquid crystal prepolymer prepared in Step 3, underwent an ultrasound treatment for 1 h, and then slowly evaporated for 24 h at a temperature of greater than 45° C. to remove heptane. Finally, the mixed system was transferred to a vacuum environment of a vacuum degree of 1023 Torr and a temperature of 50° C. for 24 h to evaporate the solvent completely, thereby yielding the desired nanoparticle-doped blue phase liquid crystal prepolymer (PDBP).

Step 5, Preparation of the Blue Phase Liquid Crystal Composite Material

The nanoparticle-doped blue phase liquid crystal prepolymer prepared in step 4 was uniformly agitated, and filled into a liquid crystal box by way of syphonage. The sample was maintained in a blue phase state by a precise temperature control heating platform, and subject to ultraviolet radiation for 30 minutes to form a polymer network by intermolecular crosslinking reaction between photo-crosslinkable groups, thereby yielding a blue phase liquid crystal composite material (PDBP+$BaTiO_3$).

Testing Method:

The testing method was the same as Example 1.

Figure 4:
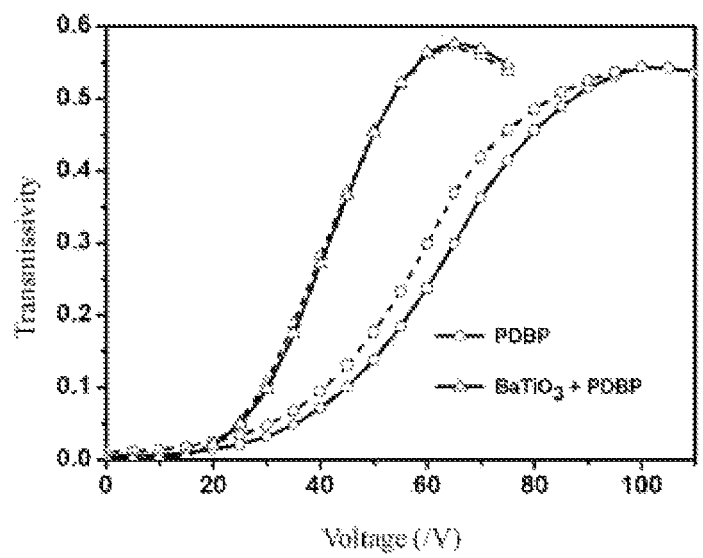
FIG. 4 is a graph exhibiting voltage vs. transmissivity of the blue phase liquid crystal composite material prepared in accordance with Example 2 of the invention.

Testing Results:

As shown in FIG. 4, it can be seen from the graph of voltage vs. transmissivity of the blue phase liquid crystal prepolymer (PDBP) and the blue phase liquid crystal composite material (PDBP+$BaTiO_3$) that the driving voltage of the liquid crystal decreased from 100V to 65V by incorporation of $BaTiO_3$ nanoparticles.

Figure 5:
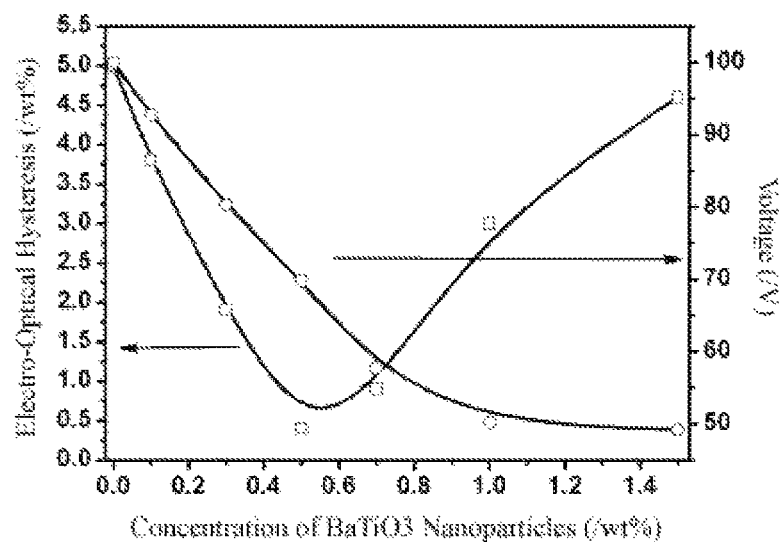
FIG. 5 is a graph exhibiting the relationship between the driving voltage and the electro-optical hysteresis of the blue phase liquid crystal composite material and the $BaTiO_3$ nanoparticle concentrations.

As shown in FIG. 5, the inventor further studied the relationship between the driving voltage and the electro-optical hysteresis of the blue phase liquid crystal composite material and the $BaTiO_3$ nanoparticle concentration. From the figure, it can be seen that the driving voltage of the blue phase liquid crystal composite material is gradually reduced with increase of the nanoparticle concentration; while the electro-optical hysteresis showed a tendency of first decreasing and then increasing. When 0.5 wt % $BaTiO_3$ nanoparticle was added, it appeared almost no hysteresis.

Figure 6:
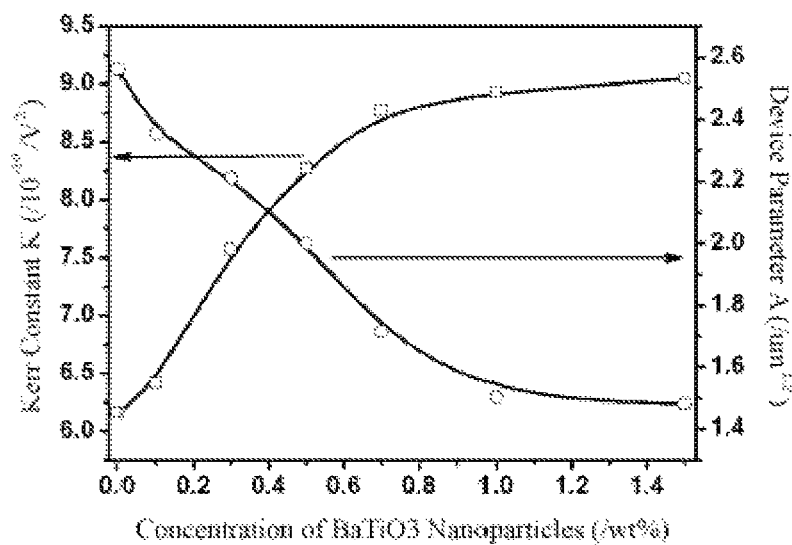
FIG. 6 is a graph exhibiting the relationship between the Kerr constant K and the device parameter A of the blue phase liquid crystal composite material and $BaTiO_3$ nanoparticle concentrations.

Referring to FIG. 6, the inventor further studied the relationship of the Kerr constant K and device parameter A of the blue phase liquid crystal composite material and the $BaTiO_3$ nanoparticle concentration. From the figure, it can be seen that the Kerr constant K of the blue phase liquid crystal gradually increased with increase of the nanoparticle concentration, while the device parameter A significantly decreased.

EXAMPLE 3

In this example, 100 g of material components were used to prepare a blue phase liquid crystal composite material by photopolymerization. The material components comprised 68.0 g of parent blue phase liquid crystal, 27.0 g of photopolymerizable monomer, 3.0 g of photoinitiator and 2.0 g of inorganic nanoparticles ZnO.

The blue phase liquid crystal composite material was prepared by the following steps:

Step 1, Preparation of the Inorganic Nanoparticles ZnO

The PTFE lining of a hydrothermal reactor was peeled off and weighed. Oleic acid (7.06 g, 25 mmol) was dropwise added into the lining with a pipette. The charged lining was placed into a 1000 mL hydrothermal reactor. Then, sodium hydroxide (160 mg) and zinc acetate dihydrate (438 mg) were dissolved in water (400 ml), and the resultant mixture was added into the hydrothermal reactor with constant agitation. Then, the reactor was sealed and placed into a drying oven and heated to 130° C. for a reaction of 4 h. After completion of the reaction, the reactor was naturally cooled to room temperature. The upper layer liquid in the reactor was recovered. The lower layer solid was washed with distilled water and ethanol, respectively, and naturally dried to give zinc oxide nanoparticles (2.0 g) as spherical ZnO non-ferroelectric inorganic nanoparticles having an average particle size of about 300 nm.

Step 2, Preparation of the Parent Blue Phase Liquid Crystal

A parent blue phase liquid crystal was prepared using the same procedures as Step 2 of Example 1, except that the material components for preparing the parent blue phase liquid crystal were 70.0 g of mixed crystal SLC-X (Yongsheng Huatsing Liquid Crystal Co., Ltd, $\Delta n=0.235$, $\Delta\in=29.6$, at 298K), 15.0 g of R811 and 15.0 g of Iso-(6OBA)$_2$. This parent blue phase liquid crystal had a blue phase temperature range of about 20.0° C. 68.0 g of parent blue phase liquid crystal thus prepared was taken for use in the next step.

Step 3, Preparation of the Blue Phase Liquid Crystal Prepolymer

The blue phase liquid crystal prepolymer was prepared using the same procedures as Step 3 of Example 1, except that the molar ratio of TMHA to BDDA was 1:9; and the amounts of the photo-polymerizable monomer, the photoinitiator and the parent blue phase liquid crystal were 27.0 g, 3.0 g and 68.0 g, respectively.

Step 4, Preparation of the Nanoparticle-Doped Blue Phase Liquid Crystal Prepolymer 2.0 g of ZnO nanoparticle was placed into acetone (50 ml) for ultrasound treatment to disperse them uniformly in the solvent. The resultant dispersion was added into the blue phase liquid crystal prepolymer prepared in Step 3 and mixed uniformly. The resultant system stood under a vacuum environment (with a vacuum degree of 1023 Torr and a temperature of 50° C.) for 24 h to evaporate the solvent completely, thereby yielding the desired nanoparticle-doped blue phase liquid crystal prepolymer (PDBP).

Step 5, Preparation of the Blue Phase Liquid Crystal Composite Material

The nanoparticle-doped blue phase liquid crystal prepolymer prepared in step 4 was uniformly agitated, and then filled into a liquid crystal box by way of syphonage. The sample was maintained in a blue phase state by a precise temperature control heating platform, and underwent an ultraviolet radiation for 30 minutes to form a polymer network by the intermolecular crosslinking reaction between photo-crosslinkable groups, thereby yielding a blue phase liquid crystal composite material (PDBP+ZnO).

Testing Method:

The testing method was the same as in Example 1.

Testing Results:

The driving voltage of the blue phase liquid crystal composite material decreased from 100 V to 91 V by incorporation of 2 wt % of ZnO nanoparticles, and the electro-optical hysteresis decreased to almost zero. With increase of the nanoparticle concentration, the driving voltage of the blue phase liquid crystal gradually decreased, the Kerr constant K gradually increased, while the device parameter A slightly decreased. In contrast, the electro-optical hysteresis showed a tendency of first decreasing and then increase, wherein it appeared no hysteresis when 2 wt % of ZnO nanoparticles were added.

EXAMPLE 4

In this example, 100 g of material components were used to prepare a blue phase liquid crystal composite material by photopolymerization. The material components comprised 75.0 g of parent blue phase liquid crystal, 22.95 g of photopolymerizable monomer, 2.0 g of photoinitiator and 0.05 g of inorganic nanoparticles $Sn_2P_2S_6$.

The blue phase liquid crystal composite material was prepared by the following steps:

Step 1, Preparation of the Inorganic Nanoparticles $Sn_2P_2S_6$

The ferroelectric nanoparticle $Sn_2P_2S_6$ was prepared in the same manner as Step 1 of Example 2, except that the large particulate $BaTiO_3$ powders were replaced with large particulates $Sn_2P_2S_6$ (with a diameter of about 1 micron). The resultant dispersion had a concentration of 0.15 mol/L, and the average diameter of the resultant $Sn_2P_2S_6$ nanoparticles was 100 nm Step 2, Preparation of the Parent Blue Phase Liquid Crystal The parent blue phase liquid crystal was prepared by using the same procedures as Step 2 of Example 1, except that the material components for preparing the parent blue phase liquid crystal were 85.0 g of mixed crystal SLC-X (Yongsheng Huatsing Liquid Crystal Co., Ltd, $\Delta n=0.235$, $\Delta\in=29.6$, at 298K), 5.0 g of R811 and 10.0 g of Iso-(6OBA)$_2$. This parent blue phase liquid crystal had a blue phase temperature range of about 15.0° C. 75.0 g of parent blue phase liquid crystal thus prepared was taken for use in the next step.

Step 3, Preparation of the Blue Phase Liquid Crystal Prepolymer

The blue phase liquid crystal prepolymer was prepared using the same procedures as Step 3 of Example 1, except that the molar ratio of TMHA to BDDA was 1:7, and the amounts of the photo-polymerizable monomer, the photoinitiator and the parent blue phase liquid crystal were 22.95 g, 2.0 g and 75.0 g, respectively.

Step 4, Preparation of the Nanoparticle-Doped Blue Phase Liquid Crystal Prepolymer A dispersion containing 0.15 mol/L inorganic nanoparticles $Sn_2P_2S_6$ was dissolved in heptane (50 ml) together with the blue phase liquid crystal prepolymer prepared in Step 3, underwent an ultrasound treatment for 1 h, and then were slowly evaporated at a temperature of above 45° C. for 24 h to remove heptane. Finally, the mixed system was transferred to a vacuum environment with a vacuum degree of 1023 Torr and a temperature of 50° C. for 24 h to evaporate the solvent completely, thereby yielding the desired nanoparticle-doped blue phase liquid crystal prepolymer (PDBP).

Step 5, Preparation of the Blue Phase Liquid Crystal Composite Material

The nanoparticle-doped blue phase liquid crystal prepolymer prepared in step 4 was uniformly agitated, and then filled into a liquid crystal box by way of syphonage. The sample was maintained in a blue phase state by a precise temperature control heating platform, and underwent an ultraviolet radiation for 30 minutes to form a polymer network by the intermolecular crosslinking reaction between photo-crosslinkable groups, thereby yielding a blue phase liquid crystal composite material (PDBP+$Sn_2P_2S_6$).

Testing Method:
The testing method was the same as in Example 1.
Testing Results:
The driving voltage of the blue phase liquid crystal composite material decreased from 100 V to 67 V by incorporation of 0.05 wt % of nanoparticulates $Sn_2P_2S_6$, and the electro-optical hysteresis decreased to almost zero. With increase of the nanoparticle concentration, the driving voltage of the blue phase liquid crystal gradually decreased and the Kerr constant K gradually increased, while the device parameter A significantly decreased. In contrast, the electro-optical hysteresis showed a tendency of first decreasing and then increase, wherein it appeared no hysteresis when 0.05 wt % $Sn_2P_2S_6$ nanoparticles were added.

The blue phase liquid crystal composite material has a driving voltage decreasing 10~60% than those without doping the inorganic nanoparticle. Moreover, the electro-optical hysteresis is relatively small (less than 0.1%), and the response time to the electric field is less than 1 ms.

It is understood that the above embodiments are merely exemplary embodiments for illustrating the concept of invention. The invention, however, is not limited to this. To a person of ordinary skill in the art, a plurality of variations and modifications may be made without departing from the spirits and essentials of the invention, while these variations and modifications are also considered as within the scope of the invention.

What is claimed is:

1. A blue phase liquid crystal composite material formed by photopolymerization of material components comprising a parent blue phase liquid crystal, a photo-polymerizable monomer, a photoinitiator, and inorganic nanoparticles, wherein the photo-polymerizable monomer is a non-liquid crystal acrylate monomer, and the non-liquid crystal acrylate monomer is a mixture of mono-functional monomers and multi-functional monomers, wherein the molar ratio of the mono-functional monomers to the multi-functional monomers are 1:1-1:9 in the non-liquid crystal acrylate monomer.

2. The blue phase liquid crystal composite material according to claim 1, wherein the material components include, based on the total weight of the blue phase liquid crystal composite material:
68.0 wt %-88.95 wt % of the parent blue phase liquid crystal;
10.0 wt %-30.0 wt % of the photo-polymerizable monomer;
1.0 wt %-3.0 wt % of the photoinitiator; and
0.05 wt %-2.0 wt % of the inorganic nanoparticles.

3. The blue phase liquid crystal composite material according to claim 1, wherein the parent blue phase liquid crystal has a blue phase temperature range of 5.0° C. or above.

4. The blue phase liquid crystal composite material according to claim 1, wherein the photoinitiator is represented by the formula of:

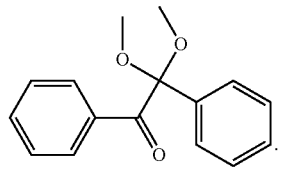 [SMILES: COC(OC)(C(=O)c1ccccc1)c1ccccc1]

5. The blue phase liquid crystal composite material according to claim 1, wherein the mono-functional monomer is TMHA, the multi-functional monomer is BDDA, and the molar ratio thereof is TMHA:BDDA=1:4, wherein TMHA is represented by the following formula:

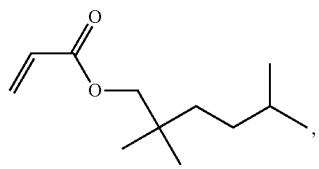

and BDDA is represented by the following formula:

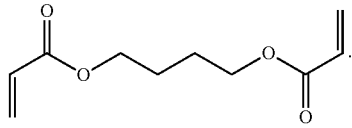

6. The blue phase liquid crystal composite material according to claim 1, wherein the inorganic nanoparticles have a particle size of 3 nm-300 nm.

7. The blue phase liquid crystal composite material according to claim 1, wherein the inorganic nanoparticles have been subject to surface modification.

8. The blue phase liquid crystal composite material according to claim 1, wherein the inorganic nanoparticles are one or more selected from the group consisting of non-ferroelectric nanoparticles ZnS, ZnO, GdS and GdSe.

9. The blue phase liquid crystal composite material according to claim 1, wherein the inorganic nanoparticles are one or more selected from the group consisting of ferroelectric nanoparticles $BaTiO_3$, $Sn_2P_2S_6$, $LiNbO_3$ and $PbTiO_3$.

10. A liquid crystal display comprising a blue phase liquid crystal composite material according to claim 1.

* * * * *